Patented July 9, 1946

2,403,872

UNITED STATES PATENT OFFICE 2,403,872

TREATMENT OF GLASS FIBERS

Kenneth J. Miller, Binghamton, N. Y., assignor to Owens-Corning Fiberglas Corporation, a corporation of Delaware No Drawing. Application October 30, 1943, Serial No. 508,400

2 Claims. (Cl. 117—72)

This invention relates to plastic laminates and similar products of resinous materials combined with fibrous reinforcing or filling material in the form of glass fibers. More particularly, it is concerned with improving the strength of plastic laminates embodying thermosetting type resins, especially urea and phenol formaldehyde, and glass fibers, glass fiber yarns and cloth.

Recently, filled or laminated plastics have been made of fibrous glass combined with resinous materials of the type usually known as plastics. The fibrous glass is ordinarily in the form of mats or webs of fibers intermatted and in random arrangement, in the form of fabrics of interwoven strands or yarns of glass fibers, or as sheets or webs of parallelly arranged glass fiber bonded together with resin or other suitable adhesive. These mats, fabrics or sheets are impregnated with resin, and a number of them are stacked and the resin cured under pressure and heat to produce the plastic laminate.

The invention is also applicable to glass fiber-plastic combinations wherein loose glass fibers are employed as a fill and are distributed haphazardly and in random arrangement throughout a body of resinous material.

The strength of plastic bodies, such as laminates, incorporating glass fibers is ordinarily much higher than laminates made with organic fibrous materials, in addition to being affected by moisture and heat to a much less degree. The actual strength has, however, particularly in the case of certain plastics, not equalled the value theoretically obtainable with glass fibers. This has been especially evident in the case of certain of the urea and phenol formaldehyde resins and is due apparently to lack of adhesion between the resin and the glass fibers of the degree necessary to develop the full strength of the glass fibers.

In an effort to improve the adhesion of the plastic or resin to the fibrous material the use of priming materials has been resorted to. Substances such as gelatin, resins, and the like have been applied to the glass fiber fabrics prior to the application of the plastic. The materials adapted to use as primers are limited by the requirement that they display high adhesion to the glass and also that they be fully compatible with the plastic. Until the present no primer has been suggested that combines these properties with moisture resistance and heat resistance of the order found in most thermosetting resins. As a result, although adhesion may have been bettered by the preliminary coating of the glass fiber fabrics with prior materials, this improved adhesion was not permanent under all moisture and heat variations to the extent that the plastic itself was.

It is an object of the present invention to improve the strength of plastics reinforced or filled with fibrous glass.

It is a further object to increase the strength of plastic-glass fiber combinations by improving the adhesion of the resinous material to the glass fiber surfaces. In this way more of the strength of the glass fibers is realized.

In the present case the adhesion of the resinous material to the glass fiber surfaces is markedly increased by providing a stable, uniform, heat and moisture resistant, very thin film on the fiber surfaces, that adheres tenaciously to the surfaces and to the resinous material.

It is a further object of the invention to form this film from materials that may be applied to the fibers, fabrics or mats in a highly fluid state. This permits thorough and uniform impregnation of the fabric or other body of fibers and also permits a desirably thin film to be formed on the fiber surfaces.

The invention provides applying to the fiber surfaces prior to the application of the plastic, a combination of substances in a highly fluid state, to coat each of the fiber surfaces. The coated fabric is then dried at room or elevated temperatures. During drying the substances react or partially react to form a resinous film on the fiber surfaces that is very thin and that adheres tightly to the surfaces. The drying is preferably effected at sufficiently low temperature, say about 70° to 90° F., so that the reaction of the substances is not entirely completed. As a result, when the plastic, for instance urea formaldehyde, is applied to the treated fabric and it is cured, the partially reacted substances may enter into the reaction of the plastic being cured to contribute further to the degree of adhesion between the cured plastic and the glass fibers.

In practicing the invention, two or more liquid substances or substances in solution capable of reacting to form a resinous material are combined and the liquid or solution is applied to the glass fibers in suitable manner as by dipping a fabric or mat into a bath of the liquid. The fabric is then dried leaving a very thin film of resin-forming material on the fiber surfaces.

Very good results in adhesion improvement are obtained from the use of phenolic or cresylic aldehyde type resin-forming materials. A number of such materials are available but it has been found preferable to employ a mixture of resorcinol and formaldehyde. For instance, a mixture of equal parts of resorcinol and a 40% formaldehyde solution in water has given exceptionally favorable results. Cresol or phenol may be used in place of resorcinol. The glass fiber fabric is dipped into the solution and then dried at room temperature or slightly elevated temperature if desired. The very low viscosity of the solution assures that all the fibers in the yarns or strands of the fabric are reached and coated by the solution.

The dried fabric is then impregnated with phenol or urea formaldehyde or similar resin and the resin is cured under heat and pressure. A plurality of impregnated fabrics are usually laminated at the time of curing to form the plastic laminate.

During curing of the resin impregnant, the resorcinol-formaldehyde mixture on the glass fibers apparently reacts to provide a very thin film on the fiber surfaces that not only seems to adhere tightly to the surfaces but is also securely joined to the resin impregnant, possibly in some cases even entering into the reaction of the resin as it is cured. Whether the effect of the treating material is explained by this or some other phenomenon, it has been found by actual tests that the adhesion of aldehyde condensation product plastics such as urea formaldehyde to glass fibers is increased about 50 to 100%.

Various modifications of the invention may be made within the scope of the appended claims.

I claim:

1. The method of making glass fiber-resin combinations which comprises applying to a glass fiber fabric an aqueous solution of a potentially reactive unreacted mixture of formaldehyde and resorcinol having a low viscosity, drying the glass fibers for a time and at a temperature sufficient to dry the coating on the fibers but insufficient to completely react the constituents of the mixture, to form a thin film of partially cured resin on the fiber surfaces, coating the dried glass fibers with a thermosetting urea formaldehyde resin, and curing the urea formaldehyde resin.

2. The method of making glass fiber-resin combinations which comprises applying to a glass fiber fabric an aqueous solution of a potentially reactive unreacted mixture of equal parts of formaldehyde and a substance of the class consisting of resorcinol, cresol and phenol, drying the glass fibers for a time and at a temperature sufficient to dry the coating on the fibers but insufficient to completely react the constituents of the mixture to form a thin film of partially cured resin on the fiber surfaces, and subsequently coating the dried glass fibers with a formaldehyde resin and then curing the resin.

KENNETH J. MILLER.